United States Patent
Lee et al.

(10) Patent No.: US 12,302,002 B2
(45) Date of Patent: May 13, 2025

(54) ELECTRONIC DEVICE AND METHOD FOR CAPTURING AN IMAGE ACCORDING TO AN OUTPUT OF A DISPLAY

(71) Applicant: SAMSUNG ELECTRONICS CO., LTD., Suwon-si (KR)

(72) Inventors: Changwoo Lee, Suwon-si (KR); Jaehun Cho, Suwon-si (KR); Hojin Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 211 days.

(21) Appl. No.: 17/716,686

(22) Filed: Apr. 8, 2022

(65) Prior Publication Data

US 2022/0337730 A1 Oct. 20, 2022

Related U.S. Application Data

(63) Continuation of application No. PCT/KR2022/003897, filed on Mar. 21, 2022.

(30) Foreign Application Priority Data

Apr. 16, 2021 (KR) .................... 10-2021-0049881

(51) Int. Cl.
*H04N 23/70* (2023.01)
*G06T 5/00* (2024.01)
(Continued)

(52) U.S. Cl.
CPC ............... *H04N 23/70* (2023.01); *G06T 5/00* (2013.01); *G09G 3/2092* (2013.01);
(Continued)

(58) Field of Classification Search
CPC ...... H04N 23/70; H04N 23/57; H04N 23/617; H04N 23/667; H04N 23/81;
(Continued)

(56) References Cited

U.S. PATENT DOCUMENTS 8,314,859 B2 11/2012 Kim et al.
8,451,223 B2 * 5/2013 Choi ..................... G06F 3/0321
345/157

(Continued)

FOREIGN PATENT DOCUMENTS

CN 112073617 A 12/2020
JP 2021-508855 A 3/2021

(Continued)

OTHER PUBLICATIONS

International Search Report (PCT/ISA/210) and Written Opinion (PCT/ISA/237) issued Jun. 17, 2022 by the International Searching Authority in International App No. PCT/KR2022/003897.

(Continued)

*Primary Examiner* — Chiawei Chen
(74) *Attorney, Agent, or Firm* — Sughrue Mion, PLLC

(57) ABSTRACT

An electronic device, including a memory; a display panel; an image sensor disposed at a lower end of the display panel; a processor operatively connected to the image sensor; and a display driver integrated circuit operatively connected to the display panel and the processor, and configured to sense that a first frame is output on the display panel and to transmit a first signal to the processor based on the first frame being output on the display panel, wherein the processor is configured to: generate the first frame having a designated pixel value based on a shoot command being received from a user, control the display panel to output the first frame, and control the image sensor to capture an image based on the first signal being received from the display driver integrated circuit, and store the captured image in the memory.

19 Claims, 16 Drawing Sheets

(51) Int. Cl.
*G06V 10/25* (2022.01)
*G09G 3/20* (2006.01)
*H04N 23/57* (2023.01)
*H04N 23/617* (2023.01)
*H04N 23/667* (2023.01)
*H04N 23/81* (2023.01)

(52) U.S. Cl.
CPC ........... *H04N 23/57* (2023.01); *H04N 23/617* (2023.01); *H04N 23/667* (2023.01); *H04N 23/81* (2023.01); *G06T 2207/20216* (2013.01); *G06V 10/25* (2022.01); *G09G 2354/00* (2013.01)

(58) Field of Classification Search
CPC ........... H04N 1/00172; H04N 1/00933; H04N 1/2129; H04N 5/77; H04N 5/907; H04N 23/00; H04N 23/60; H04N 23/73; H04N 23/74; H04N 23/54; H04N 23/63; G06T 5/00; G06T 2207/20216; G09G 3/2092; G09G 2354/00; G09G 2370/04; G09G 5/393; G06V 10/25; G06V 10/60
See application file for complete search history.

(56) References Cited

U.S. PATENT DOCUMENTS

| | | | |
|---|---|---|---|
| 8,965,449 B2 | 2/2015 | Alvarez Rivera et al. | |
| 9,143,668 B2 | 9/2015 | Mathew et al. | |
| 9,547,389 B2* | 1/2017 | Lee | G06F 3/0416 |
| 10,057,541 B2 | 8/2018 | Chung et al. | |
| 10,102,789 B2 | 10/2018 | Evans, V et al. | |
| 11,082,547 B2 | 8/2021 | Xu et al. | |
| 11,153,520 B2 | 10/2021 | Park et al. | |
| 2007/0152950 A1* | 7/2007 | Kaehler | G09G 3/3426 345/102 |
| 2009/0102763 A1 | 4/2009 | Border et al. | |
| 2011/0006997 A1* | 1/2011 | Porwal | G09G 3/3406 345/173 |
| 2011/0090366 A1* | 4/2011 | Yoon | H04N 23/63 348/231.2 |
| 2011/0304532 A1* | 12/2011 | Suh | H04N 9/12 345/207 |
| 2012/0162490 A1* | 6/2012 | Chung | H04N 23/631 348/E5.037 |
| 2013/0057763 A1* | 3/2013 | Cha | G09G 5/12 348/554 |
| 2013/0135499 A1 | 5/2013 | Song | |
| 2015/0049165 A1 | 2/2015 | Choi | |
| 2015/0271392 A1* | 9/2015 | Musgrave | G09G 3/3406 348/207.11 |
| 2017/0084231 A1 | 3/2017 | Chew | |
| 2017/0116932 A1* | 4/2017 | Musgrave | G09G 3/36 |
| 2020/0042762 A1* | 2/2020 | Fu | G02B 3/0006 |
| 2020/0241607 A1* | 7/2020 | Bikumala | G06F 1/1637 |
| 2020/0342800 A1 | 10/2020 | Li et al. | |
| 2022/0060713 A1* | 2/2022 | Cao | G06K 7/1447 |
| 2022/0116520 A1 | 4/2022 | Hsieh et al. | |
| 2022/0148500 A1* | 5/2022 | Hsieh | G09G 3/3208 |
| 2022/0206346 A1* | 6/2022 | Jiang | G02F 1/134309 |
| 2022/0368833 A1* | 11/2022 | Kanai | H04N 23/73 |

FOREIGN PATENT DOCUMENTS

| | | |
|---|---|---|
| KR | 10-2010-0088680 A | 8/2010 |
| KR | 10-2012-0071963 A | 7/2012 |
| KR | 10-2013-0058910 A | 6/2013 |
| KR | 10-1462351 B1 | 11/2014 |
| KR | 10-2020-0014408 A | 2/2020 |
| WO | 2020/180304 A1 | 9/2020 |

OTHER PUBLICATIONS

Communication issued on Jun. 18, 2024 by the European Patent Office for European Patent Application No. 22788280.0.
Communication dated Mar. 19, 2025, issued by the Korean Intellectual Property Office in Korean Application No. 10-2021-0049881.

* cited by examiner

ELECTRONIC DEVICE AND METHOD FOR CAPTURING AN IMAGE ACCORDING TO AN OUTPUT OF A DISPLAY

CROSS-REFERENCE TO RELATED APPLICATION(S)

This application is a bypass continuation application of International Application No. PCT/KR2022/003897 filed on Mar. 21, 2022, which claims priority to Korean Patent Application No. 10-2021-0049881, filed on Apr. 16, 2021, in the Korean Intellectual Property Office, the disclosures of which are incorporated by reference herein in its entirety.

BACKGROUND

1. Field

The disclosure relates to an electronic device and, more specifically, to a method for capturing images by an electronic device, wherein a frame having a designated pixel value is used to control light from an organic body so as not to be transmitted to an image sensor adjacent to a display panel, thereby acquiring high-resolution images.

2. Description of Related Art

Recently, image sensor have been disposed at a lower end of a display, which may be referred to as under display camera (UDC) technology, in order to increase the screen ratio of a mobile device and to minimize the bezel. Interaction between a user and a communication device may be improved through a visual matching effect, like a mirror, during selfie image capture, and the image sensor size may be expanded such that high-resolution images can be acquired.

In the case of under display camera (UDC) technology, serious image quality damage may occur because the image sensor is adjacent to the display. For example, light intensity may weaken as reflected light of an actual object directed into the image sensor may pass through a transmitting body of the display. Further, if the display has an increased light-emitting body (for example, organic body, OLED), light from the light-emitting body may be directed into the image sensor positioned at the lower end of the display. This may seriously degrade the quality of captured images.

SUMMARY

Various embodiments of the disclosure may prevent light from a light-emitting body from being unnecessarily directed into an image sensor such that high-resolution still images can be acquired.

Additional aspects will be set forth in part in the description which follows and, in part, will be apparent from the description, or may be learned by practice of the presented embodiments.

In accordance with an aspect of the disclosure, an electronic device includes a memory; a display panel; an image sensor disposed at a lower end of the display panel; a processor operatively connected to the image sensor; and a display driver integrated circuit operatively connected to the display panel and the processor, and configured to sense that a first frame is output on the display panel and to transmit a first signal to the processor based on the first frame being output on the display panel, wherein the processor is configured to: generate the first frame having a designated pixel value based on a shoot command being received from a user, control the display panel to output the first frame, and control the image sensor to capture an image based on the first signal being received from the display driver integrated circuit, and store the captured image in the memory.

The first frame may include a pixel group corresponding to a predetermined first region, and the predetermined first region may correspond to at least one of a partial region or an entire region of the display panel, and corresponds to a position of a camera.

The processor may be further configured to: control the image sensor to output a preview image having a resolution lower than a predetermined resolution, and control the image sensor to output, based on the first signal, the captured image having a resolution higher than the predetermined resolution.

The electronic device may further include an image signal processor operatively connected to the image sensor in order to process the image output from the image sensor, wherein the image signal processor may be configured to: determine whether an output image that is output by the image sensor is the preview image or is the captured image, perform image quality-related restoration processing on the preview image, and convert the captured image to a low resolution captured image.

The processor may be further configured to control the image signal processor to generate the first frame based on the shoot command being received from the user, and to transmit the low resolution captured image to the display driver integrated circuit.

The display driver integrated circuit may be further configured to: acquire statistical information including at least one of an average of pixels in a predetermined region of interest (ROI), or a variance of the pixels in the predetermined ROI, analyze the statistical information to determine whether a frame displayed on the display panel corresponds to the first frame, and, based on the frame corresponding to the first frame, transmit, to the processor, information about whether the frame corresponds to the first frame.

The image signal processor may be further configured to generate the first frame such that a predetermined first pattern is displayed, and the display driver integrated circuit may be further configured to determine that a frame displayed on the display panel is the first frame based on the frame including the predetermined first pattern.

The processor may be further configured to: adjust a brightness of the display panel in units of time to configure a first interval during which a brightness of a frame displayed on the display panel for a predetermined time is lower than a predetermined brightness, and control the image sensor to output the captured image during the first interval, and the display driver integrated circuit may be further configured to sense whether the first interval is entered, and to transmit the first signal to the processor based on the first interval being entered.

The processor may be further configured to: analyze a signal entering the image sensor to generate statistical information including at least one from among auto exposure (AE) information, auto focus (AF) information, or auto white balance (AWB) information, and the statistical information may be generated based on a parameter obtained immediately after the image signal processor generates the first frame, or based on a parameter obtained immediately before the image signal processor generates the first frame.

The processor may be configured to analyze, based on the first frame being displayed on the display panel, a signal entering the image sensor to generate statistical information including at least one from among auto exposure (AE) information, auto focus (AF) information, or auto white balance (AWB) information.

In accordance with an aspect of the disclosure, a method for capturing an image by an electronic device includes generating a first frame having a designated pixel value based on a shoot command being received from a user; outputting the first frame through a display panel, wherein the outputting may include sensing that the first frame is displayed on the display panel and transmitting, to a processor, information indicating that the first frame is displayed on the display panel; capturing an image by an image sensor based on the sensing that the first frame is displayed on the display panel; and storing the captured image in a memory based on a still capture command instructing storage of the image.

The first frame may include a pixel group corresponding to a predetermined first region, and the predetermined first region may correspond to at least one of a partial region or an entire region of the display panel, which corresponds to a position of a camera.

The method may further include outputting, by the image sensor, a preview image having a resolution lower than a predetermined resolution, and outputting, but the image sensor, the captured image having a resolution higher than the predetermined resolution based on the sensing that the first frame is displayed on the display panel.

The electronic device may include an image signal processor operatively connected to the image sensor and configured to process the image output from the image sensor, and the first frame may be generated by the image signal processor based on the shoot command being received from the user, and the method further may include: converting the captured image into a low resolution captured image by the image signal processor, and transmitting, by the image signal processor, the low resolution captured image to a display driver integrated circuit.

The sensing that the first frame is displayed on the display panel may include: acquiring statistical information including at least one of an average of pixels in a predetermined region of interest (ROI), or a variance of the pixels in the predetermined ROI; determining whether a frame displayed on the display panel corresponds to the first frame; and based on the frame corresponding to the first frame, transmitting, to the processor, information about whether the frame corresponds to the first frame.

The sensing that the first frame is displayed on the display panel may include: generating the first frame such that a predetermined first pattern is displayed; and based on a frame displayed on the display panel including the predetermined first pattern, determining that the frame is the first frame.

The method may further include analyzing a signal entering the image sensor to generate statistical information including at least one from among auto exposure (AE) information, auto focus (AF) information, or auto white balance (AWB) information.

The method may further include: based on the first frame being displayed on the display panel, analyzing the signal entering the image sensor to generate the statistical information based on a parameter obtained immediately after the image signal processor generates the first frame, or based on a parameter obtained immediately before the image signal processor generates the first frame, or based on the first frame being displayed on the display panel, analyzing the signal entering the image sensor to generate the statistical information.

The method may further include: performing image quality-related restoration processing with respect to a preview image output by the image sensor and control the display panel to display the preview image, and controlling the display panel to display the first frame instead of the preview image based on the shoot command being received from the user.

In accordance with an aspect of the disclosure, a method for capturing an image by an electronic device includes adjusting a brightness of a display panel in units of time based on a shoot command being received from a user to configure a first interval during which brightness of a frame displayed on the display panel for a predetermined time is lower than a predetermined brightness; capturing an image through an image sensor during the first interval; and storing the captured image in a memory.

In accordance with an aspect of the disclosure, an electronic device includes a display panel; an image sensor disposed beneath the display panel; a processor configured to generate a frame having a predetermined pixel value based on a shoot command being received from a user, and control the display panel to display the frame; and a display driver integrated circuit configured to detect that the frame is output on the display panel, and to transmit a signal to the processor based on the frame being output on the display panel, wherein the processor may be further configured to, based on the signal being received, control the image sensor to capture an image, and control the memory to store the captured image.

A previous frame may be displayed on the display panel before the frame is displayed on the display panel, and the predetermined pixel value may be determined so that an amount of light produced by the display panel is reduced based on an output of the display panel changing from the previous frame to the frame.

A previous frame may be displayed on the display panel before the frame is displayed on the display panel, while the previous frame is displayed on the display panel, the image sensor may receive a first amount of light produced by the display panel, and while the frame is displayed by the display panel, the image sensor may receive a second amount of light produced by the display panel, and the second amount of light may be less than the first amount of light.

According to various embodiments, light generated by a display may be blocked through a black frame, and actual reflected light may be directed into an image sensor, thereby obtaining high-resolution images.

According to various embodiments, a preview image and a still shot image may be distinguished such that different types of processing are performed, respectively. This may provide high-resolution images.

According to various embodiments, a predetermined pattern may be formed on a black frame to be distinguished from a case in which the actual image is black, and display of the black frame on a display may be automatically sensed. Accordingly, images may be captured at the timepoint of display of the black frame on the display, thereby obtaining high-resolution images.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
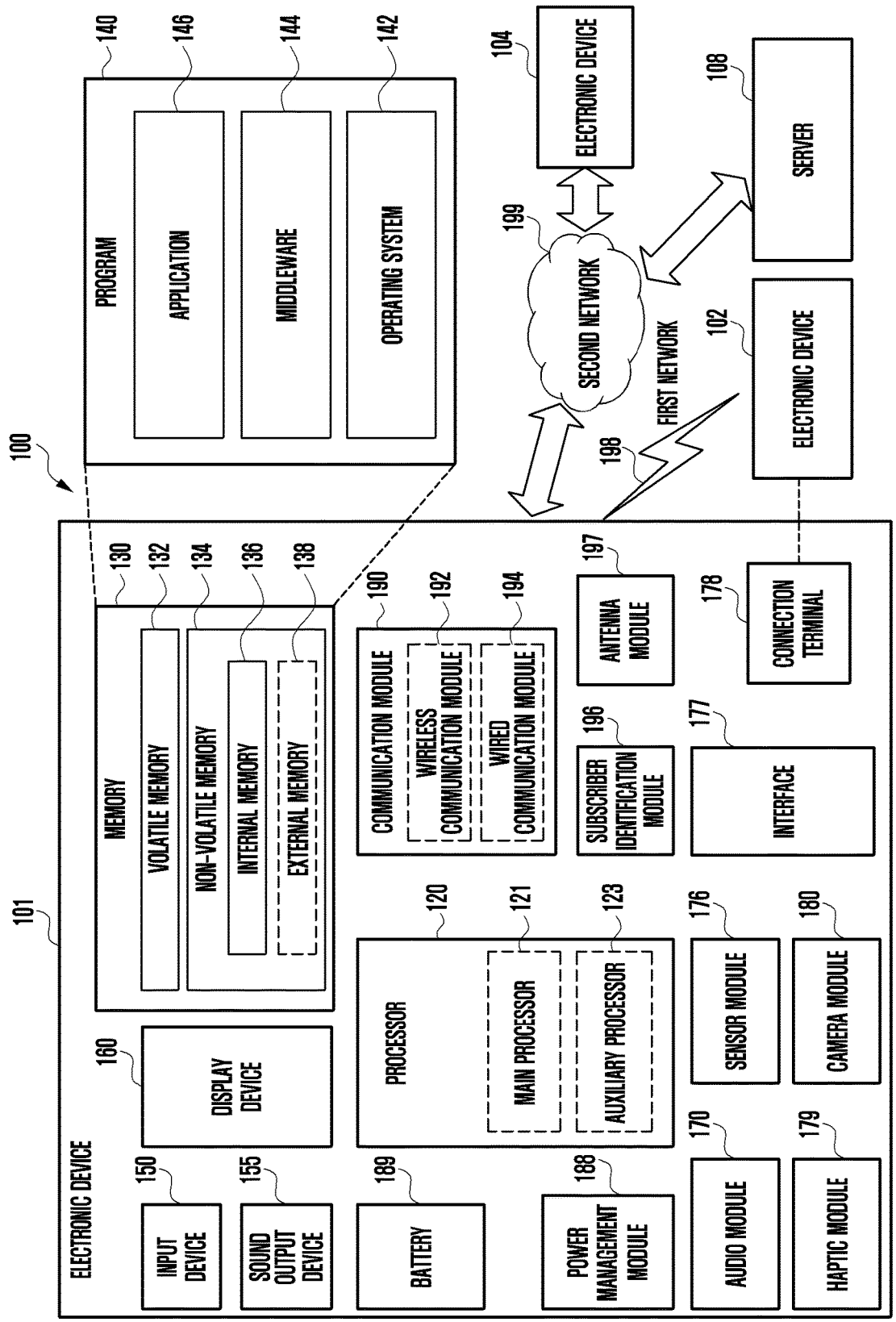
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
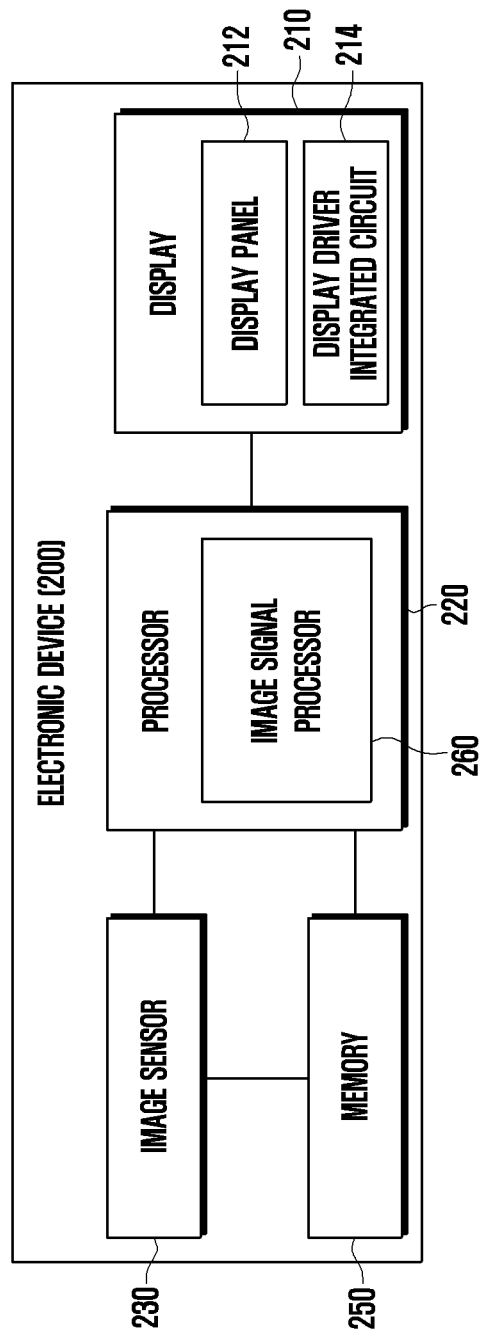
FIG. 2 is a block diagram of an electronic device according to various embodiments.

FIG. 2 is a block diagram of an electronic device according to various embodiments.

Referring to FIG. 2, an electronic device 200 may include a display 210, a processor 220, an image sensor 230, a memory 250, and an image signal processor 260. Even when at least some of the illustrated elements are omitted or replaced as necessary, various embodiments of the disclosure may be implemented. The electronic device 200 may further include at least some of the elements and/or functions of the electronic device 101 in FIG. 1.

According to various embodiments, the memory 250 may include a volatile memory (e.g., the volatile memory 132 in FIG. 1) and/or a nonvolatile memory (e.g., the nonvolatile memory 134 in FIG. 1), and may be electrically connected to the processor 220. The memory 250 may store various instructions that can be executed by the processor 220. The instructions may include control commands for arithmetic and logic calculation, data movement, input/output, etc. that can be recognized by a control circuit. Furthermore, the memory 250 may store at least a part of the program 140 in FIG. 1.

According to various embodiments, the processor 220 is an element capable of controlling the elements of the electronic device 200 and/or performing data processing or calculation regarding communication, and may include at least some of the elements and/or functions of the processor 120 in FIG. 1. The processor 220 may be electrically connected to each of the elements (e.g., the memory 250, the display 210, etc.) of the electronic device 200. There is no limitation to calculation and data processing functions implemented by the processor 220 in the electronic device 200. However, hereinafter, a description will be made of various embodiments for controlling the image signal processor 260 to display a first frame (e.g., a black frame) having a designated pixel value on the display 210, and generating and storing a high-resolution image through the image sensor 230 and the memory 250. Operations of the processor 220, described later, may be performed by loading the above-described instructions stored in the memory 250.

According to various embodiments, the processor 220 may perform control to generate a first frame including a frame having a designated pixel value in response to a shoot command input from a user, may perform control to output the first frame through a display panel 212, and may perform control to capture an image by the image sensor 230 when a first signal is received from a display driver integrated circuit 214, and store the captured image in the memory 250. In embodiments, a "shoot command" or "shot command" may refer to a command to capture, take, or "shoot" a picture or "shot".

According to an embodiment, the first frame may include a pixel group corresponding to a predetermined first region. Furthermore, the first region may include a region corresponding to at least one of a partial region or the entire region of the display panel, which corresponds to the position of a camera.

According to an embodiment, the display 210 is an element for displaying an image, and may be implemented as a liquid crystal display (LCD), a light-emitting diode (LED) display, an organic light-emitting diode (OLED) display, etc. The display 210 may include at least some of elements and/or functions of the display module 160 in FIG. 1. The display 210 may convert light, received from the image sensor 230, to an electrical signal, may receive the electrical signal, and may provide the electrical signal to a user through the display panel 212. The display driver integrated circuit (IC) 214 may control the display panel 212 to determine an image or a frame displayed through the display panel 212. According to an embodiment, the first frame may be displayed in a partial region or the entire region of the display panel 212.

According to an embodiment, the display driver integrated circuit 214 may be operatively connected to the display panel 212 and the processor 220, and may be configured to sense that the first frame is output on the display panel 212, and transmit to the first signal to the processor 220.

According to an embodiment, the image sensor 230 may include, for example, one image sensor selected from among image sensors having different attributes, such as an RGB sensor, a black and white (BW) sensor, an IR sensor, or a UV sensor, multiple image sensors having the same attribute, or multiple image sensors having different attributes. Each image sensor included in the image sensor 230 may be implemented by using, for example, a charged coupled device (CCD) sensor or a complementary metal oxide semiconductor (CMOS) sensor.

According to an embodiment, the image signal processor 260 may perform at least one type of image-processing with respect to an image acquired through the image sensor 230 or an image stored in the memory 250. The at least one type of image-processing may include, for example, depth map generation, three-dimensional modeling, panorama generation, feature point extraction, image synthesis, or image compensation (e.g., noise reduction, resolution adjustment, brightness adjustment, blurring, sharpening, or softening). In embodiments, the image signal processor 260 may control (e.g., exposure time control, readout timing control, or the like) at least one of elements (e.g., the image sensor 230) included in a camera module. The image processed by the image signal processor 260 may be stored in the memory 250 again in order to be additionally processed. According to an embodiment, the image signal processor 260 may be included in at least a part of the processor 220, or may a separate processor operated independently of the processor 220. When the image signal processor 260 is formed as a processor which is separate from the processor 220, at least one image processed by the image signal processor 260 may be displayed through the display 210 as it is or after being additionally image-processed by the processor 220.

Figure 3:
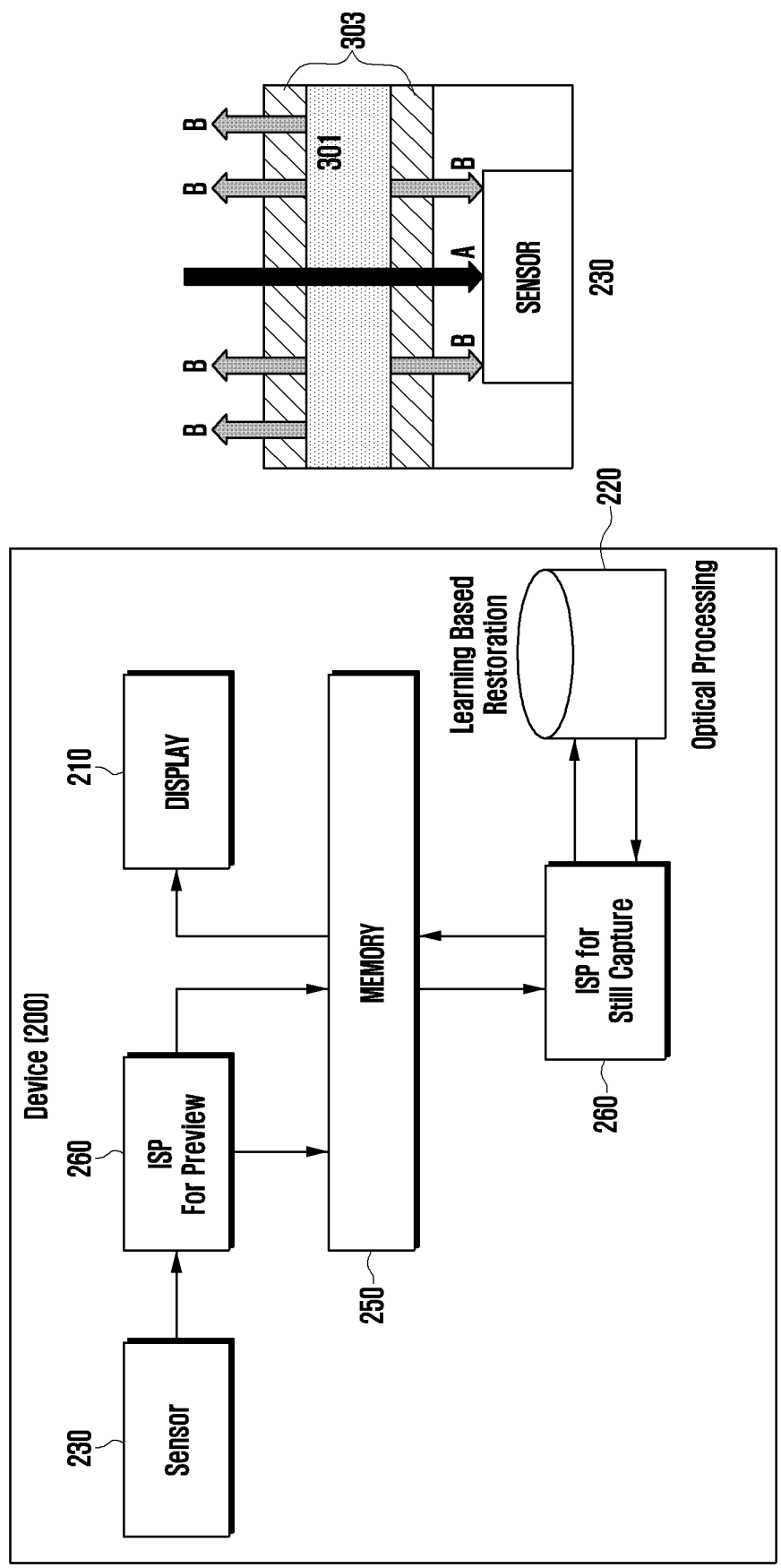
FIG. 3 illustrates a process of capturing an image by an electronic device according to various embodiments.

FIG. 3 illustrates a process of capturing an image by an electronic device according to various embodiments.

An electronic device 200 according to an embodiment may include an image sensor 230. Functions and roles of the image sensor 230 have been described in relation to FIG. 2. The image sensor 230 may be positioned at a lower end of a display panel (e.g., the display panel 212 in FIG. 2), and this under-display camera (UDC) technology may be used to increase the screen ratio of the electronic device 200. For example, the image sensor 230 may be placed adjacent to an organic body 301 and a transmission body 303. The organic body 301 may include at least one among, for example, a liquid crystal display (LCD), a light-emitting diode (LED) display, and an organic light-emitting diode (OLED) display.

In embodiments, when the image sensor is referred to as being positioned at a lower end of a display panel, this may mean that the image sensor is positioned or disposed beneath or underneath some or all of the display panel. For example, if a display panel has a upward portion that is directed toward an outside of an electronic device, for example an upper surface which is intended to be viewed by a user, the image sensor may be positioned in a downward portion of the display panel that is below the upward portion or the upper surface, for example below or beneath of some or all of the display panel.

According to an embodiment, light received through the image sensor 230 may be converted to an electrical signal and transmitted to the image signal processor 260 through a mobile industry processor interface (MIPI). The image signal processor 260 may convert the electrical signal to a signal suitable for the display 210 to configure a preview screen.

According to one embodiment, the image sensor 230 may be affected by light (B) generated from the organic body 301 in addition to actually reflected light (A), which may be for example reflected from an object that is to be imaged by sensor 230. For example, the brightness of the organic body 301 may be continuously changed depending on content information displayed on the display 210. The actually reflected light (A) and the light (B) from the organic body 301 may enter the image sensor 230 while being mixed, thereby causing serious degradation of the quality of an image. The degradation of image quality caused by the physical arrangement of the image sensor 230 may be partially overcome through separate signal processing. For example, with respect to image quality degradation caused by the UDC, neural net-based learning may be performed and convolution processing may be performed by using the same. However, restoration processing using this learning-based image restoration processing or optical-based inverse compensation technique has limitation, and thus complete restoration may be impossible.

Hereinafter, in FIGS. 4A to 12, a description will be made of an electronic device 200 for fundamentally removing image quality degradation caused by ambient light (B) introduced into the image sensor 230 placed adjacent to the display 210 in a UCD environment, and a method for capturing an image thereby, according to embodiments.

Figure 4A:
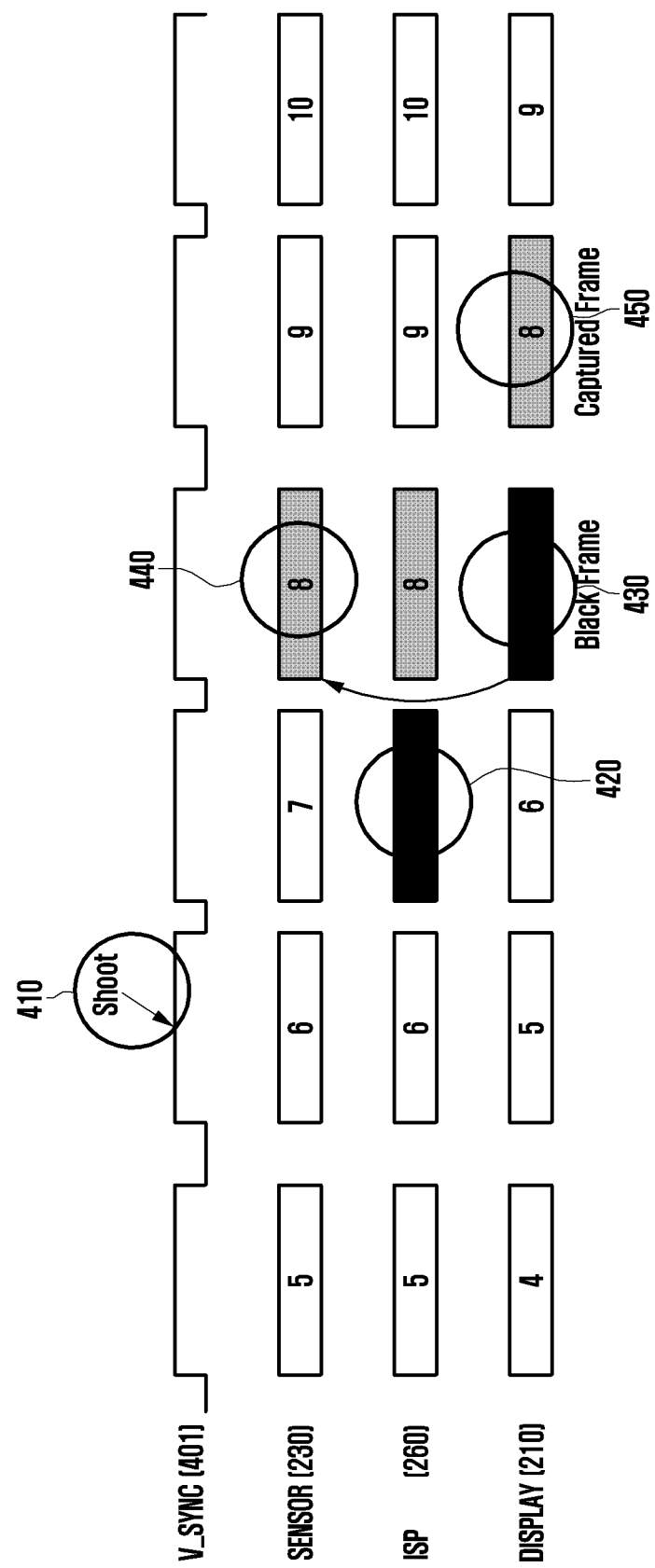
FIGS. 4A and 4B illustrate, in units of frames, a process of capturing an image by an electronic device according to various embodiments.
Figure 4B:
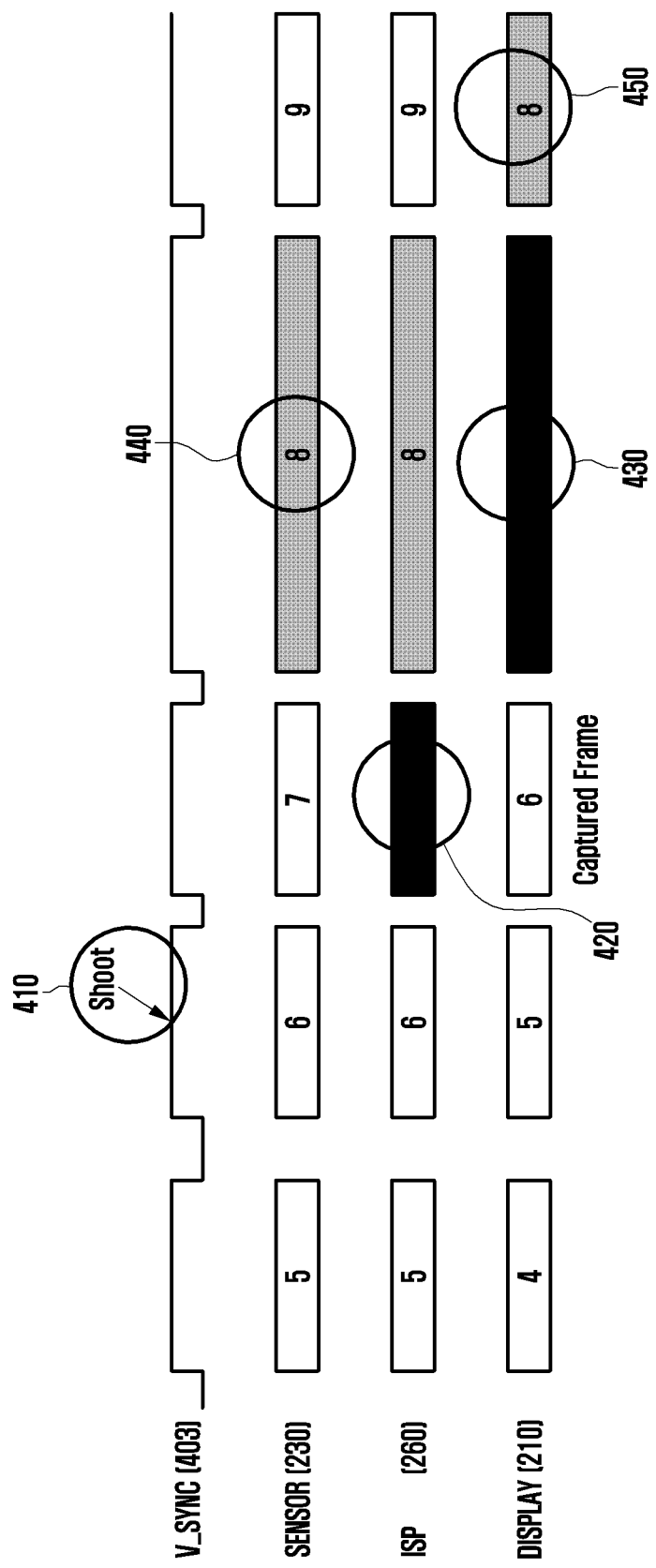

FIGS. 4A and 4B illustrate, in units of frames, a process of capturing an image by an electronic device according to various embodiments.

According to an embodiment, in the process of capturing an image by an electronic device (e.g., the electronic device 200 in FIG. 2), a user may transfer a shoot command to the electronic device 200. A processor (e.g., the processor 220 in FIG. 2) of the electronic device 200 may control an image signal processor (e.g., the image signal processor 260 in FIG. 2) to generate a first frame (e.g., a black frame) when the user's shoot command is issued in order to suppress reception of light generated from an organic body (e.g., the organic body 301 in FIG. 3). The first frame may include a frame having a designated pixel value or a frame having brightness lower than a predetermined level (e.g., lower than 2 when black is set to 0 and white is set to 10). In embodiments, the brightness, which may be a reference of the first frame, is not fixed, and may be configured at a level at which light generated when the first frame has been output on a display panel (e.g., the display panel 212 in FIG. 2) does not affect an image that is output from the image sensor 230. The first frame generated by the image signal processor 260 may be output to a display (e.g., the display 210 in FIG. 2). When the first frame is transferred to the display 210 and thus the same effect as turning-off of the display 210 is caused, the processor 220 may transmit a capture command, for example a still capture command, to an image sensor (e.g., the image sensor 230 in FIG. 2). The image sensor 230 may receive the capture command and may capture an image at a time when the first frame is displayed on the display 210. The capture operation may include a readout operation of the image sensor 230.

According to an embodiment, in operation 410, the processor 220 may sense a shoot command from a user, and may control the image signal processor 260 to generate a first frame. In operation 420, the image signal processor 260 may generate the first frame, and may transfer the same to the display 210. In operation 430, the first frame may be displayed on a display panel (e.g., the display panel 212 in FIG. 2), and a display driver integrated circuit (e.g., the display driver integrated circuit 214 in FIG. 2) may sense whether the first frame is displayed, and may transfer pertinent information to the processor 220. The processor 220 may receive first frame display information from the display driver integrated circuit 214, and may transmit a capture command to the image sensor 230. In operation 440, the image sensor 230 may receive the capture command from the processor 220, and may capture an image at a time when the first frame is displayed on the display panel 212. In operation 450, the captured image may be displayed on the display panel 212.

FIG. 4B illustrates an image processing process when a preview image and a still image have different resolutions.

According to an embodiment, in operation 410, the processor 220 may sense a shoot command from a user, and may control the image signal processor 260 to generate a first frame. In operation 420, the image signal processor 260 may generate the first frame, and may transfer the same to the display 210. In operation 430, the first frame may be displayed on the display panel 212, and the display driver integrated circuit 214 may sense whether the first frame is displayed, and may transfer pertinent information to the processor 220. The processor 220 may receive first frame display information from the display driver integrated circuit 214, and may transmit a capture command to the image sensor 230. In operation 440, the image sensor 230 may receive the capture command transmitted from the processor 220, and may capture a high-resolution image at a time when the first frame is displayed on the display panel 212. In operation 450, the captured high-resolution image may be displayed on the display panel 212.

Figure 5:
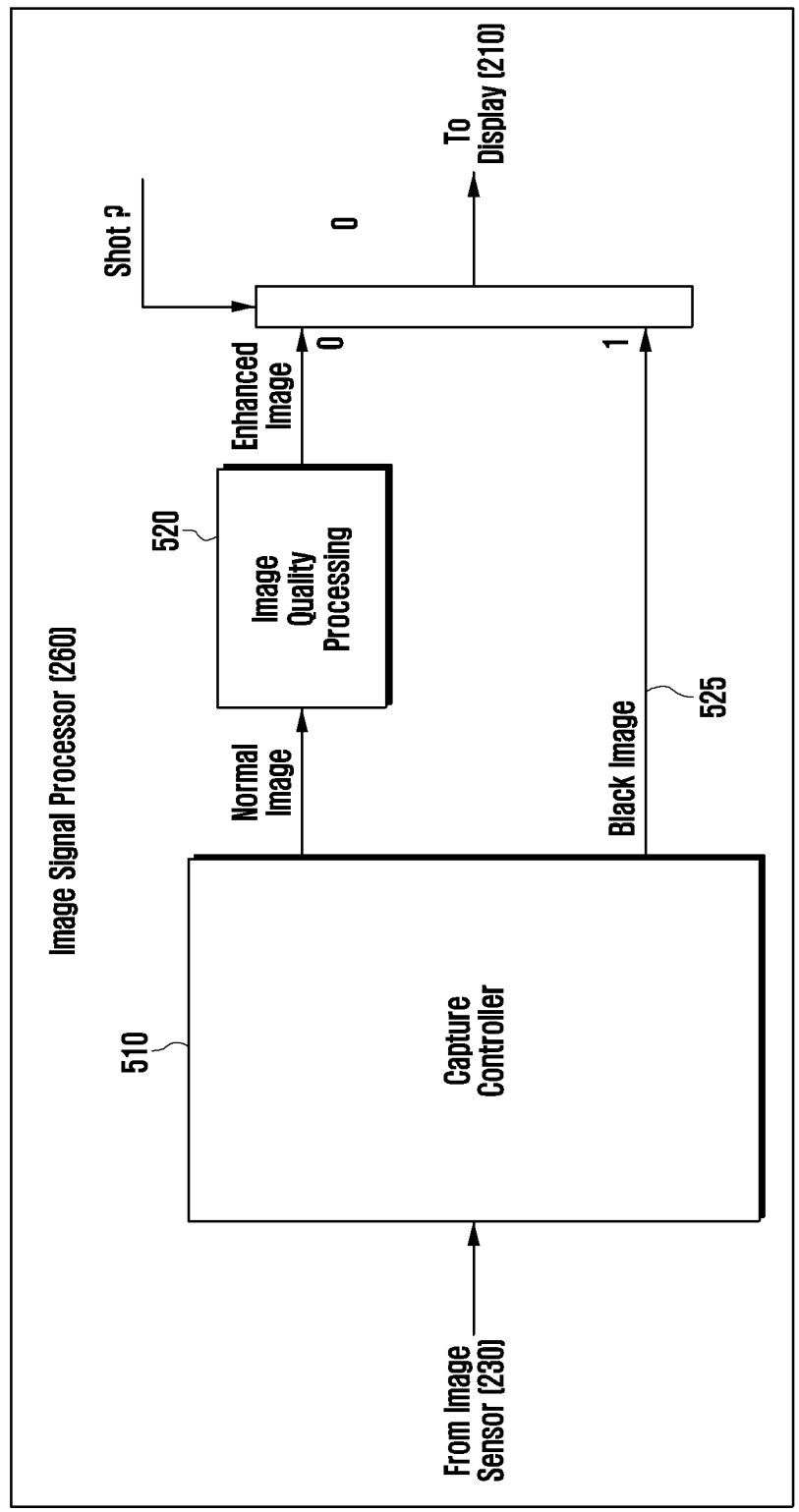
FIG. 5 illustrates a process of separately processing a preview image and a still image in an electronic device according to various embodiments.

FIG. 5 illustrates a process of separately processing a preview image and a still image in an electronic device according to various embodiments.

According to an embodiment, the image signal processor 260 may include a capture controller 510 and an image quality processing unit 520. The capture controller 510 may classify an image received from an image sensor (e.g., the image sensor 230 in FIG. 2) into a preview image and a still image.

According to one embodiment, a processor (e.g., the processor 220 in FIG. 2) may control the image sensor 230 to output a preview image having a resolution lower than a predetermined level, and may control the image sensor to output, in response to a first signal, a capture image having a resolution higher than the predetermined level.

According to one embodiment, the image signal processor 260 may be operatively connected to the image sensor 230 in order to process the image output from the image sensor 230. Furthermore, the image signal processor 260 may determine whether an image output by the image sensor 230 is for a preview or is for a capture.

According to one embodiment, the image signal processor 260 may perform image quality-related restoration processing through the image quality processing unit 520 with respect to a preview-dedicated image. The image signal processor 260 may convert the capture image output by the image sensor 230 to a low resolution such that the capture image can be provided as a preview screen to the user. For additional image quality improvement, the processor (e.g., the processor 220 in FIG. 2) may perform software processing or digital signal processing (DSP).

According to an embodiment, the processor 220 may perform image-quality-related restoration processing with respect to the preview image output by the image sensor 230, and may control a display panel (e.g., the display panel 212 in FIG. 2) to display the preview image, and may control the display driver integrated circuit 214 such that the display panel 212 displays a first frame instead of the preview image in response to the shoot command input from the user.

According to one embodiment, the processor 220 may control the image signal processor 260 to generate the first frame in response to the shoot command input from the user. Furthermore, the processor 220 may transmit the capture image, converted to a low resolution by the image signal processor 260, to the display driver integrated circuit 214. The display driver integrated circuit 214 may display the image transmitted from the processor 220 on the display panel 212.

Figure 6A:
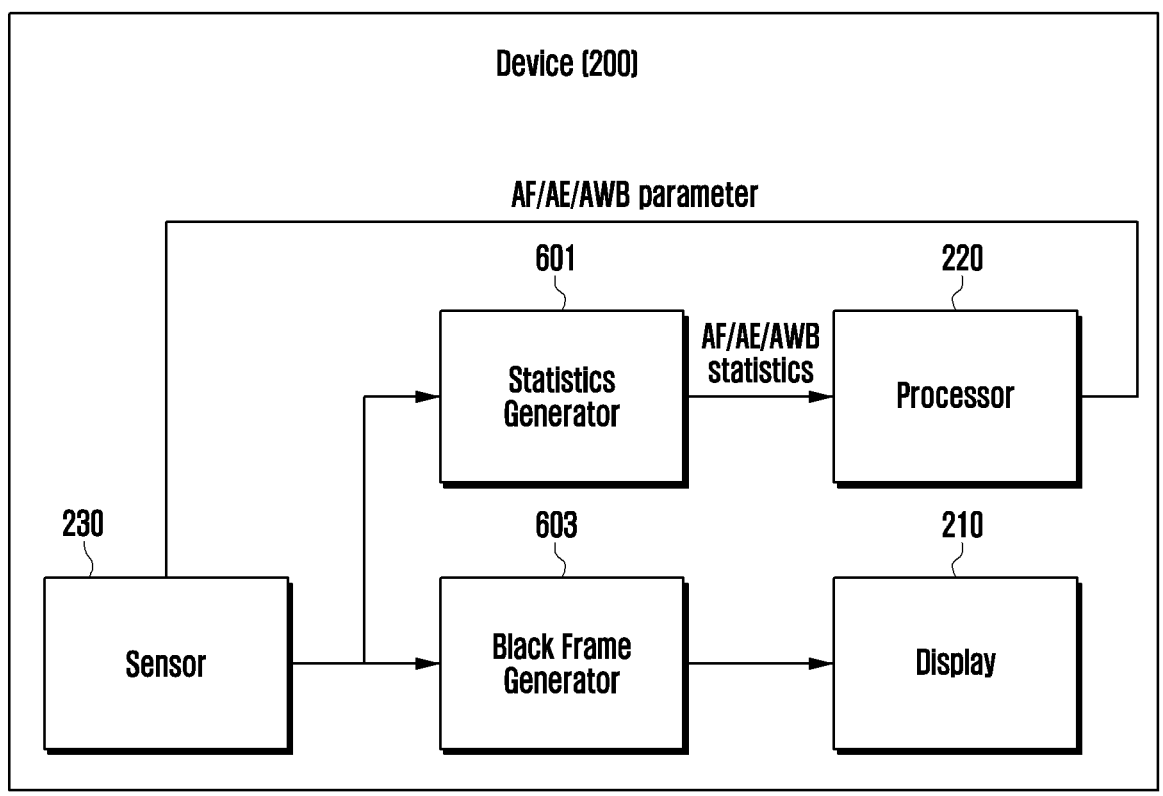
FIG. 6A illustrates a block diagram related to an operation of an image sensor according to various embodiments.
Figure 6B:
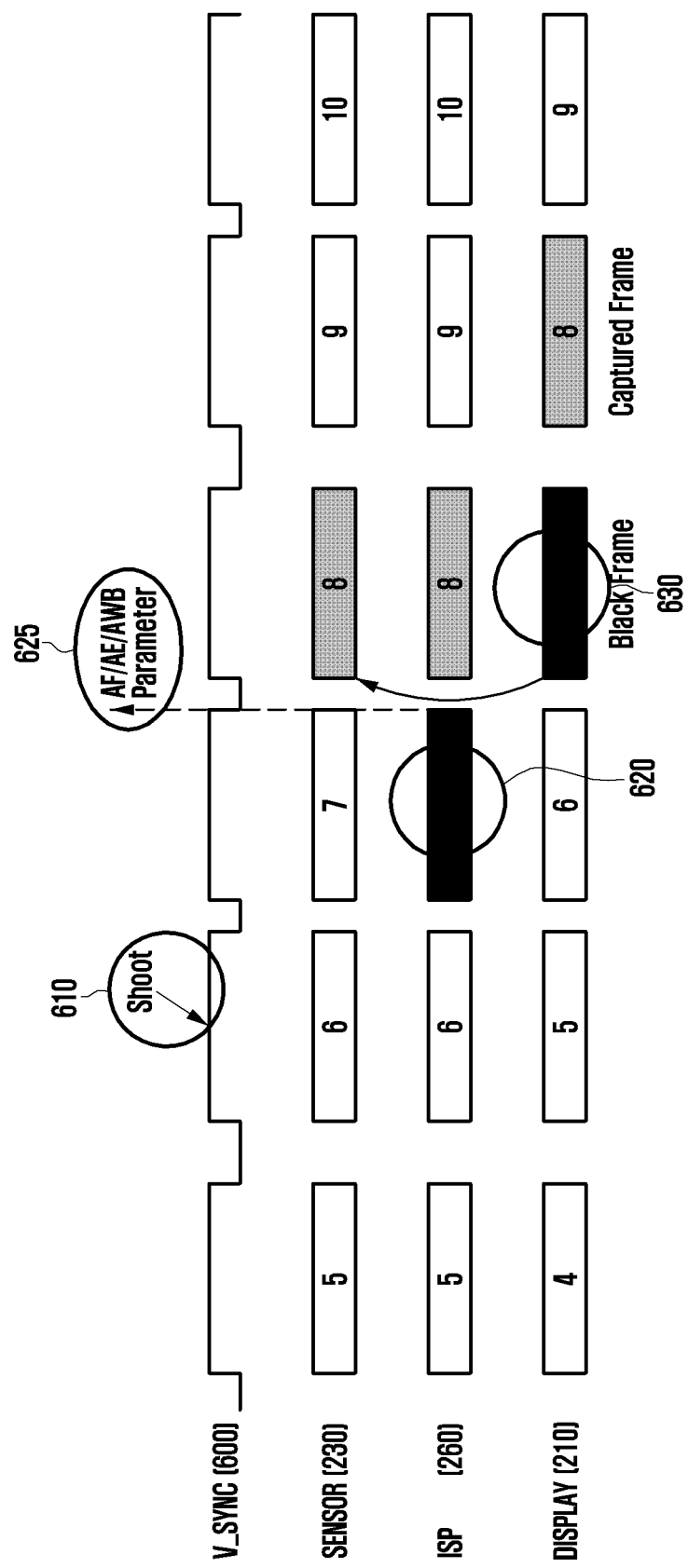
FIG. 6B illustrates, in units of frames, an operation of an image sensor according to various embodiments.

FIG. 6A illustrates a block diagram related to an operation of an image sensor according to various embodiments. FIG. 6B illustrates, in units of frames, an operation of an image sensor according to various embodiments.

According to one embodiment, the processor 220 may analyze a signal entering the image sensor 230 to generate statistical information including at least one among auto exposure (AE), auto focus (AF), or auto white balance (AWB). The processor 220 may use, to generate the statistical information, a parameter related to auto exposure (AE), auto focus (AF), or auto white balance (AWB) immediately after an image signal processor (e.g., the image signal processor 260 in FIG. 2) generates a first frame, or may use, to generate the statistical information, a parameter related to auto exposure (AE), auto focus (AF), or auto white balance (AWB) immediately before the image signal processor 260 generates the first frame.

According to one embodiment, when the first frame is displayed on the display panel, the processor 220 may analyze a signal entering the image sensor 230 to generate statistical information including at least one among auto exposure (AE), auto focus (AF), or auto white balance (AWB).

According to an embodiment, auto exposure (AE), auto focus (AF), and auto white balance (AWB) may be determined based on information entering the image sensor 230 positioned at the lower end of the display 210. Auto exposure (AE) may imply that a camera module adjusts the degree of exposure to light by itself, auto focus (AF) may imply that the camera module adjusts focus by itself, and auto white balance (AWB) may imply that the camera module adjusts a while color by itself. Appropriate auto exposure (AE), auto focus (AF), and auto white balance (AWB) may be necessary for image capturing. Furthermore, in generation of a first frame (e.g., a black frame), there is a need to generate the first frame while or after processing auto exposure (AE), auto focus (AF), and auto white balance (AWB).

As in FIG. 6A, when a statistics generator 601 for AE/AF/AWB precedes a pattern generator (e.g., a black frame generator 603), exposure and white balance information of the image sensor 230 may be utilized by using a parameter just prior to a still capture frame. The pattern generator may generate a designated pattern, and the designated pattern may include a frame having a value smaller than a predetermined specific pixel value, such as a black frame or a gray frame. In addition, the designated pattern may include a predetermined specific image pattern.

According to one embodiment, the image signal processor 260 may generate the first frame such that a predetermined first pattern is displayed. When a frame displayed on the display panel 212 includes a first pattern, the display driver integrated circuit 214 may determine that the frame displayed on the display panel 212 is the first frame.

Referring to FIG. 6B, in operation 610, the processor 220 may sense a shoot command from a user, and may control the image signal processor 260 to generate a first frame. In operation 620, the image signal processor 260 may generate the first frame, and may transfer the same to the display 210. In operation 630, the first frame may be displayed on the display panel 212, and a display driver integrated circuit (e.g., the display driver integrated circuit 214 in FIG. 2) may sense whether the first frame is displayed, and may transfer pertinent information to the processor 220. The processor 220 may receive first frame display information from the display driver integrated circuit 214, and may transmit a capture command, which may be for example a sensor readout command) to the image sensor 230. The image sensor 230 may receive the capture command transmitted from the processor 220, and may capture a high-resolution image at a time when the first frame is displayed on the display panel (e.g., the display panel 212 in FIG. 2). The captured high-resolution image may be displayed on the display panel 212.

At operation 625, immediately after acquiring statistical information (e.g., AF, AE, or AWB), the image signal processor 260 having the same configuration as in FIG. 6A may not capture an image, but may sense that a first frame (e.g., the black frame) appears on the display 210 and a black frame disappears on the display 210, and perform an image capture to capture the captured frame. The image signal processor 260 may use the above-described designated pattern of the pattern generator to determine the presence of the black frame. An example of this will be described in detail in describing FIGS. 9A and 9B.

At a time immediately before the first frame is displayed on the display panel 212 in operation 630, AE/AF/AWB numerical values of the image sensor 230 may be determined by using a parameter related to AE/AF/AWB. If the time immediately before the first frame is displayed on the display panel 212 in operation 630 is exceeded, the first frame may be displayed on the display panel 212 to affect the AE/AF/AWB numerical values of the image sensor 230. However, the electronic device 200 herein may determine AE/AF/AWB numerical values at the time immediately before the first frame is displayed on the display panel 212, for example at operation 625, and may apply accurate AE/AF/AWB to an image to be captured, thereby capturing a high-resolution image.

Figure 7A:
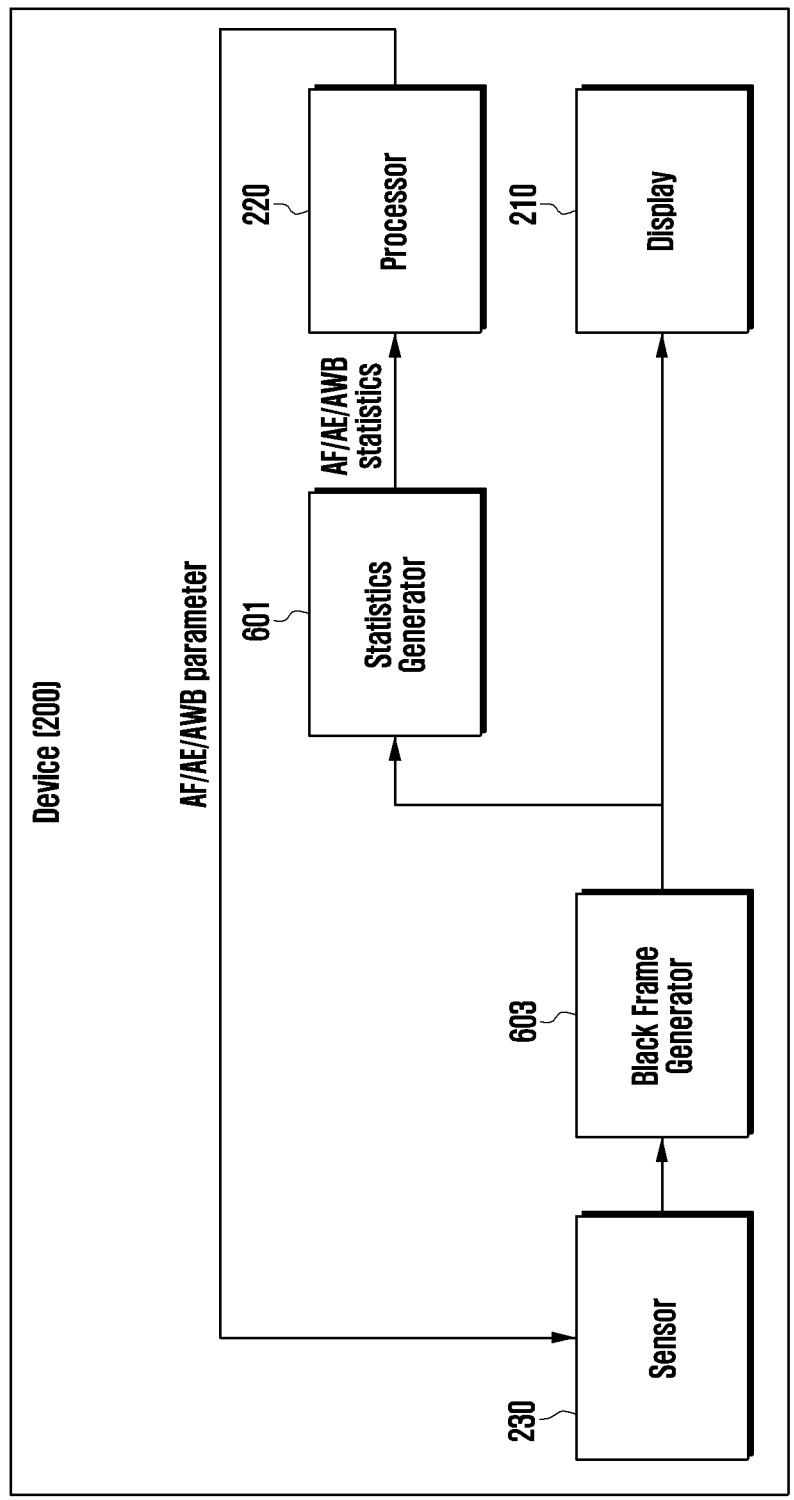
FIG. 7A illustrates a block diagram related to an operation of an image sensor according to various embodiments.
Figure 7B:
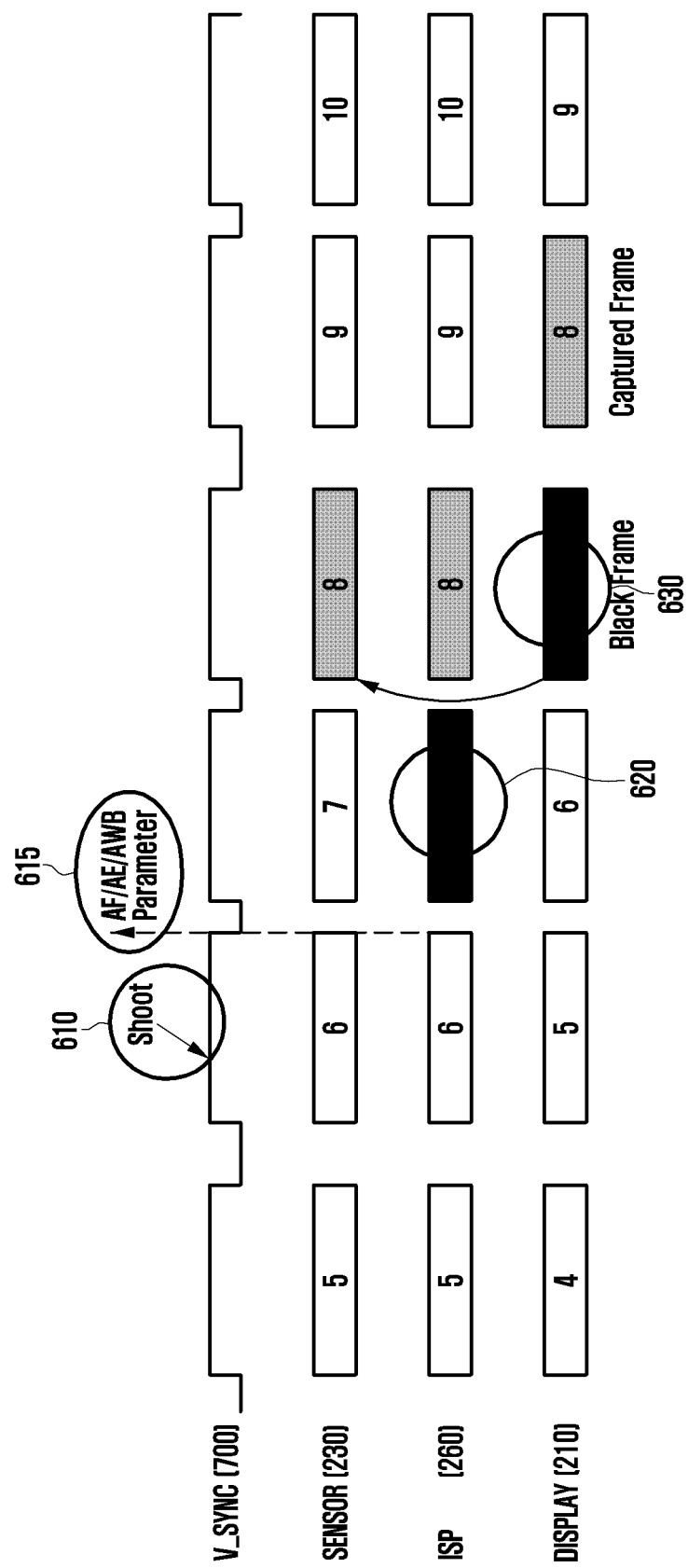
FIG. 7B illustrates, in units of frames, an operation of an image sensor according to various embodiments.

FIG. 7A illustrates a block diagram related to an operation of an image sensor according to various embodiments. FIG. 7B illustrates, in units of frames, an operation of an image sensor according to various embodiments.

As illustrated in FIG. 7A, when a pattern generator (e.g., a black frame generator 603) precedes a statistics generator 601 for AE/AF/AWB, processing based on timing may be needed for appropriate AE/AF/AWB application of a still capture frame.

Referring to FIG. 7B, in operation 610, the processor 220 may sense a shoot command from a user, and may control the image signal processor 260 to generate a first frame. In operation 620, the image signal processor 260 may generate the first frame, and may transfer the same to the display 210. In operation 630, the first frame may be displayed on the display panel 212, and a display driver integrated circuit (e.g., the display driver integrated circuit 214 in FIG. 2) may sense whether the first frame is displayed, and may transfer pertinent information to the processor 220. The processor 220 may receive first frame display information from the display driver integrated circuit 214, and may transmit a capture command to the image sensor 230. The image sensor 230 may receive the capture command transmitted from the processor 220, and may capture a high-resolution image at a time when the first frame is displayed on the display panel (e.g., the display panel 212 in FIG. 2). The captured high-resolution image may be displayed on the display panel 212.

Immediately after acquiring statistical information (e.g., AF, AE, or AWB), for example at operation 615, the image signal processor 260 having the configuration of FIG. 7A may not capture an image, but may sense that a first frame (e.g., a black frame) appears on the display 210 and a black frame disappears from the display 210, and may perform an image capture (captured frame). The image signal processor 260 may use the above-described designated pattern of the pattern generator to determine the presence of the black frame. The image signal processor 260 in FIG. 7A, unlike that in FIG. 6A, may generate a first frame (e.g., a black frame) at operation 620 immediately after acquiring the statistical information (e.g., AF, AE, or AWB) at operation 615. Subsequently, the image signal processor 260 may determine at operation 630 whether the first frame is displayed on the display 210, and then may perform image capturing.

According to an embodiment, a time when the processor 220 acquires the statistical information (e.g., AF, AE, or AWB) may not be limited to times before or after generation of the first frame. For example, when the first frame is generated and displayed on the display panel 212, the processor 220 may analyze a signal entering the image sensor 230 thereafter to generate statistical information including at least one among auto exposure (AE), auto focus (AF), or auto white balance (AWB).

At a time immediately before the image signal processor 260 generates the first frame in operation 620, AE/AF/AWB numerical values of the image sensor may be determined by using a parameter related to AE/AF/AWB. If the time when the image signal processor 260 generates the first frame in operation 620 is exceeded, information about the first frame may affect statistics generator 601 for AE/AF/AWB. In this case, the first frame may affect the AE/AF/AWB numerical values of the image sensor 230. However, the electronic device 200 herein may determine AE/AF/AWB numerical values at a time, for example at operation 615, immediately before the image signal processor 260 generates the first frame, and may apply accurate AE/AF/AWB to an image to be captured, thereby capturing a high-resolution image. In this case, still capture timing may correspond to the time at operation 630 when the first frame is displayed on the display 210. The time when the AE/AF/AWB numerical values of the image sensor is determined using the parameter related to AE/AF/AWB may correspond to the time, for example at operation 615, immediately before the image signal processor 260 generates the first frame. A time gap may occur between capture timing of an image and application timing of statistical information thereto.

Figure 8:
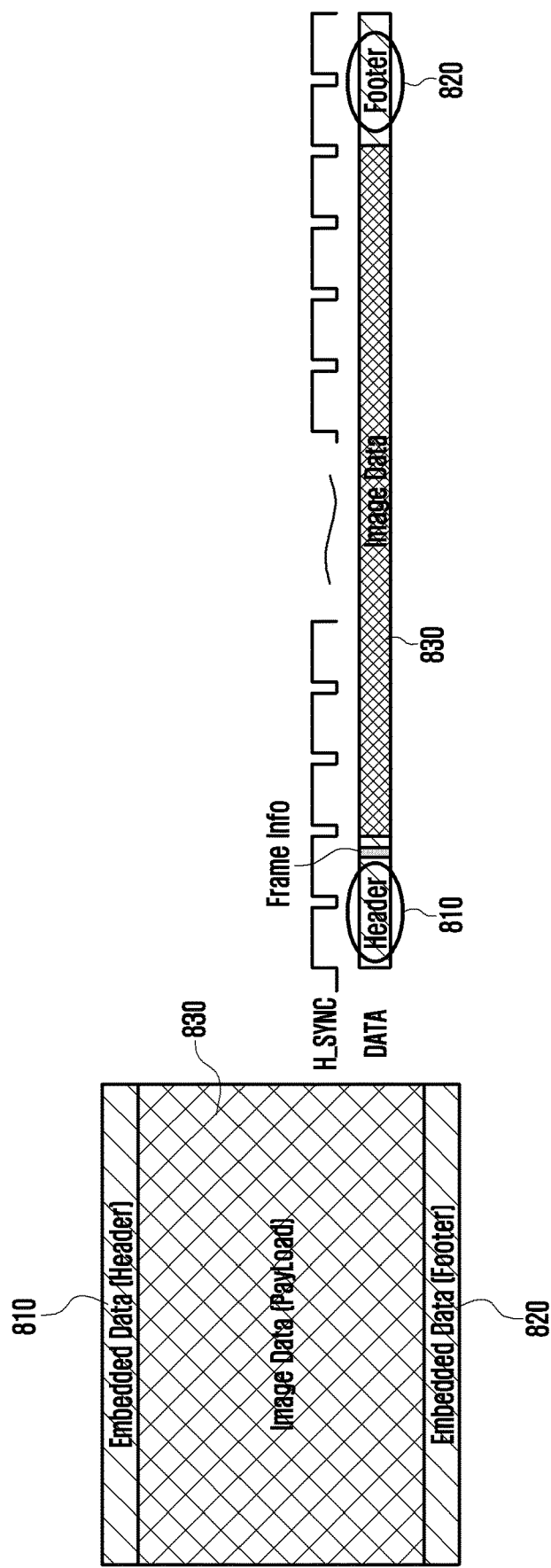
FIG. 8 illustrates a process of information transfer between an image sensor and an image signal processor of an electronic device according to various embodiments.

FIG. 8 illustrates a process of information transfer between an image sensor and an image signal processor of an electronic device according to various embodiments.

According to an embodiment, an image sensor (e.g., the image sensor 230 in FIG. 2) may transfer, to an image signal processor (e.g., the image signal processor 260 in FIG. 2), various types of information 830 about a corresponding frame before and after an actual image/video signal. The various types of information 830 about the corresponding frame may include, for example, light exposure information, motion of a subject, and a resolution, but are not limited thereto. The various types of information 830 about the frame may be embedded in a header 810 and/or a footer 820 of image data.

According to an embodiment, the image signal processor 260 may use image frame-related information existing in a predetermined location in the header 810 to determine how a currently input image is to be processed. For example, when the currently input image corresponds to an image for a still shot, the image signal processor 260 may cancel generation of a first frame (e.g., a black frame). Subsequently, an original image of the currently input image may be stored in a memory (e.g., the memory 250 in FIG. 2), and an image, processed by performing specific processing, may be displayed on a display (e.g., the display 210 in FIG. 2).

Figure 9A:
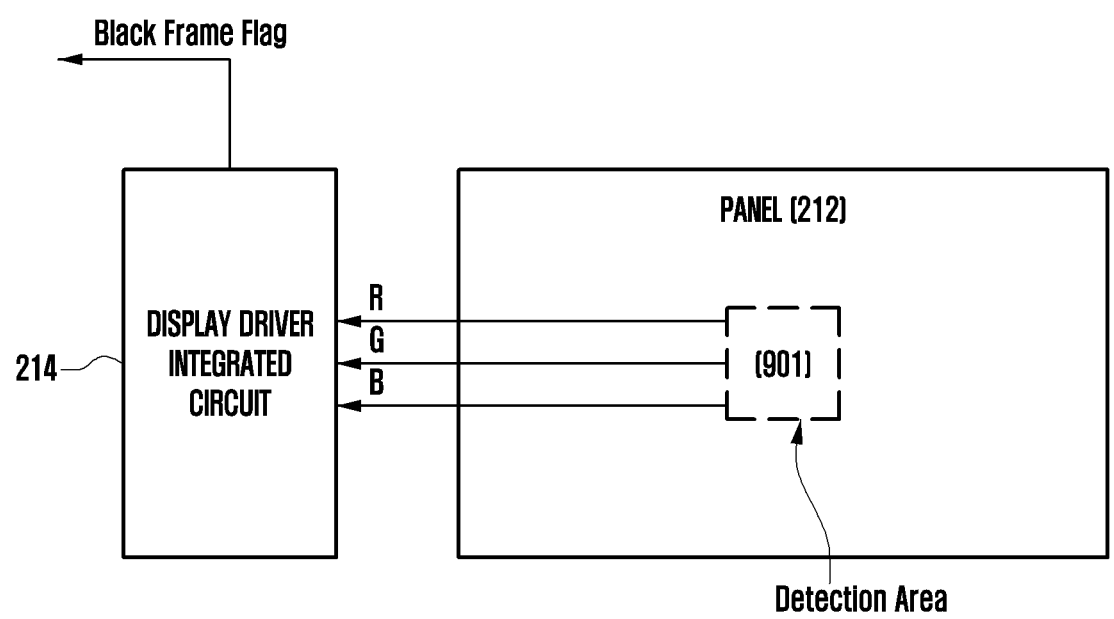
FIGS. 9A and 9B illustrate a process of determining whether a first frame is displayed by a display of an electronic device according to various embodiments.
Figure 9B:
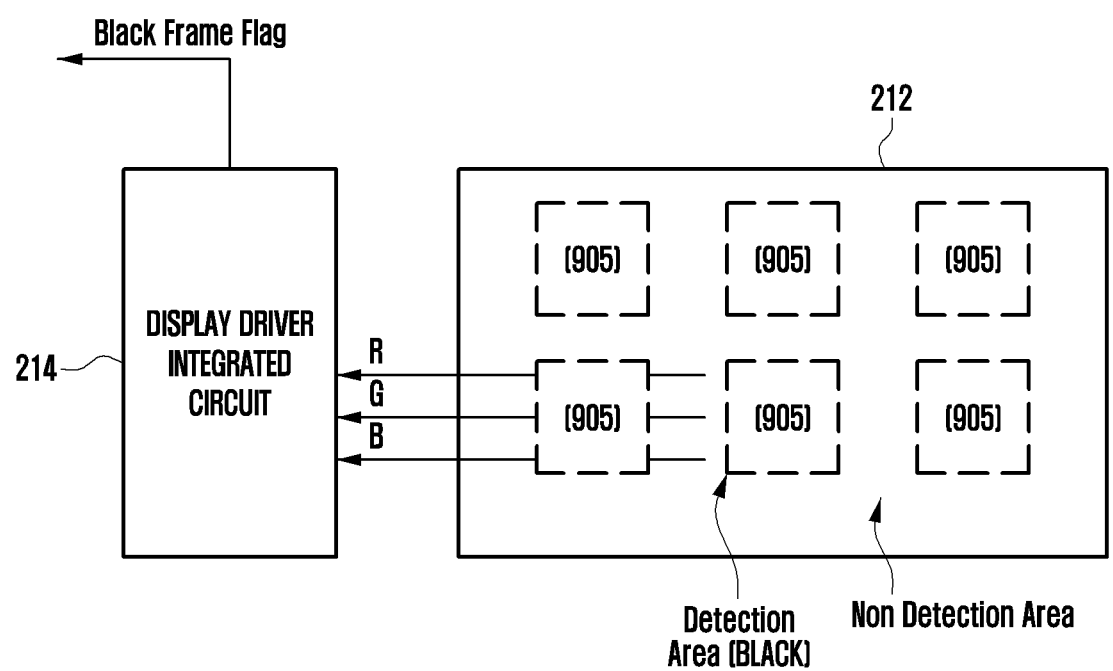

FIGS. 9A and 9B illustrate a process of determining whether a first frame is displayed by a display of an electronic device according to various embodiments.

According to an embodiment, a first frame (e.g., a black frame) generated by an image signal processor (e.g., the image signal processor 260 in FIG. 2) may be transferred to a display (e.g., the display 210 in FIG. 2). Subsequently, the display 210 may output a screen on which the first frame has been displayed. In this process, latency may occur for a predetermined time according to a camera mode and the performance of a processor (e.g., the processor 220 in FIG. 2). The processor 220 can merely determine that the first frame has been generated through the image signal processor 260, and it may be difficult for processor 220 to determine, by itself, whether the first frame is currently displayed on the display 210. Thus, if there is latency between the generation of the first frame by the image signal processor 260 and displaying of the first frame on the display 210, an image may be captured even when the first frame is not displayed on the display 210. In this case, light (e.g., light (B) in FIG. 3) due to a content displayed on the display 210 may be mixed with actually reflected light (e.g., light (A) in FIG. 3), thereby causing image quality degradation.

According to an embodiment, the display 210 of an electronic device (e.g., the electronic device 200 in FIG. 2) may include a display driver integrated circuit (e.g., the display driver integrated circuit 214 in FIG. 2) and a display panel (e.g., the display panel 212 in FIG. 2). The display driver integrated circuit 214 may include a system capable of determining, by itself, whether an image being displayed on the display panel 212 is black. In embodiments, the display driver integrated circuit 214 may determine, through statistical information analysis of a signal input into the display 210, whether a frame corresponds to a first frame (e.g., black frame). Subsequently, the display driver integrated circuit 214 may transfer pertinent information to the processor 220.

According to one embodiment, the display driver integrated circuit 214 may acquire statistical information including at least one of average or variance of pixels in units of predetermined region of interest (ROI). The display driver integrated circuit 214 may analyze the statistical information to determine whether a frame displayed on the display panel 212 corresponds to the first frame, and, when the frame displayed on the display panel 212 corresponds to the first frame, may transmit, to the processor 220, information about whether the frame corresponds to the first frame.

According to an embodiment, when an image to be actually displayed includes multiple black frames like the first frame, it may be difficult that the processor 220 to determine whether the first frame is currently being displayed on a display panel (e.g., the display panel 212 in FIG. 2) or whether the actual image is currently being displayed thereon. The following method may be used to determine whether the first frame detected by the display driver integrated circuit 214 is desired and generated by the image signal processor 260 or whether an actual image captured by a camera is in a dark color.

According to an embodiment, a predetermined pattern may be inserted into the first frame generated by the image signal processor 260. When the display driver integrated circuit 214 detects the predetermined pattern, the display driver integrated circuit 214 may determine that an image being displayed corresponds to the first frame generated by the image signal processor 260. In this case, a pattern detection area of the display driver integrated circuit 214 may be limited to areas 901 or 905 in which the image sensor 230 is disposed. The display driver integrated circuit 214 may analyze RGB information of an image in the areas 901 or 905 in which the image sensor 230 is disposed, to determine whether an image being displayed on the display panel 212 corresponds to the first frame. In addition, a user-friendly image-capturing effect may be applied by inserting a graphic effect into a liquid crystal part at which a camera is positioned.

Figure 10:
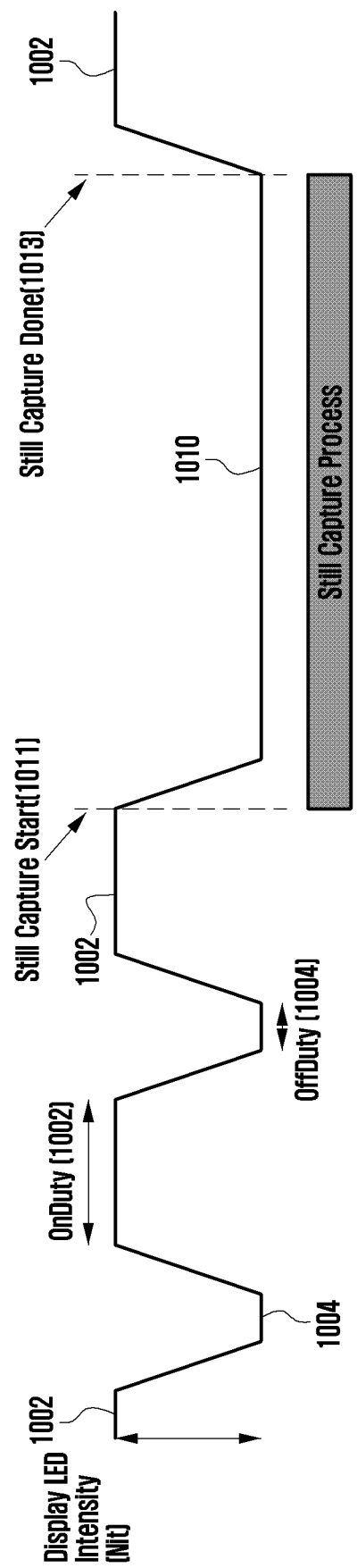
FIG. 10 illustrates a method for capturing an image by an electronic device according to various embodiments.

FIG. 10 illustrates a method for capturing an image by an electronic device according to various embodiments.

According to an embodiment, a processor (e.g., the processor 220 in FIG. 2) may receive shot timing information of an image to be captured through a first frame (e.g., black frame) output from an image signal processor (e.g., the image signal processor 260 in FIG. 2) to control the brightness of a display (e.g., the display 210 in FIG. 2). In embodiments, the processor 220 may adjust the light duty of the display 210 to capture a high-resolution image. When the image signal processor 260 equally transfers a predetermined image, a shoot command of a user may be input into the display 210. The processor 220 may adjust the light duty of the display 210 to implement a same or similar effect as the effect of displaying the first frame. In an interval at which a black screen is displayed on a display panel (e.g., the display panel 212 in FIG. 2) by lowering the brightness of light, the processor 220 may capture an image through an image sensor (e.g., the image sensor 230 in FIG. 2). When the capture is completed, the display 210 may perform an original operation with a capture completion signal for example still capture done signal 1013.

According to an embodiment, the display 210 may periodically maintain on-duty 1002 and off-duty 1004 states. The on-duty 1002 state may imply a state in which an organic body (e.g., the organic body 301 in FIG. 3) of the display 210 is emitting light. The off-duty 1004 state may imply a state in which the organic body of the display 210 is not emitting light. A driving method using a duty cycle may include a pulse width modulation (PWM) driving method, and may use a method for implementing targeted brightness through the sum of times of ON intervals. The processor 220 may adjust a duty ratio. For example, when the duty ratio is 5:5, ratios of light-emitting time (on duty) and non-light-emitting time (off duty) may be the same. The processor 220 may differently control the ratio of a light-emitting time through the duty ratio, and the duty ratio may be changed depending on the light-emitting intensity of the organic body 301.

The processor 220 may artificially maintain the off-duty 1004 state for a long time, for example longer than other times at which the off-duty 1004 state is maintained. During this period 1010, which may begin for example with a capture initiation signal, for example still capture start 1011, the processor 220 may adjust the light duty of the display 210 to implement the same effect as the effect of displaying the first frame. Subsequently, the processor 220 may capture an image through an image sensor (e.g., the image sensor 230 in FIG. 2). When the capture is completed, the display 210 may perform an original operation with a capture completion signal, for example still capture done signal 1013.

According to one embodiment, the processor 220 may adjust the brightness of the display panel 212 in units of time to configure a first interval during which the brightness of a frame displayed on the display panel 212 for a predetermined time is lower than a predetermined level. Furthermore, the processor 220 may control the image sensor 230 to output a capture image during the first interval. A display driver integrated circuit (e.g., the display driver integrated circuit 214 in FIG. 2) may be operatively connected to the display panel 212 to sense whether entering the first interval is performed, and may transmit a first signal to the processor 220 when the entering the first interval is performed.

Figure 11:
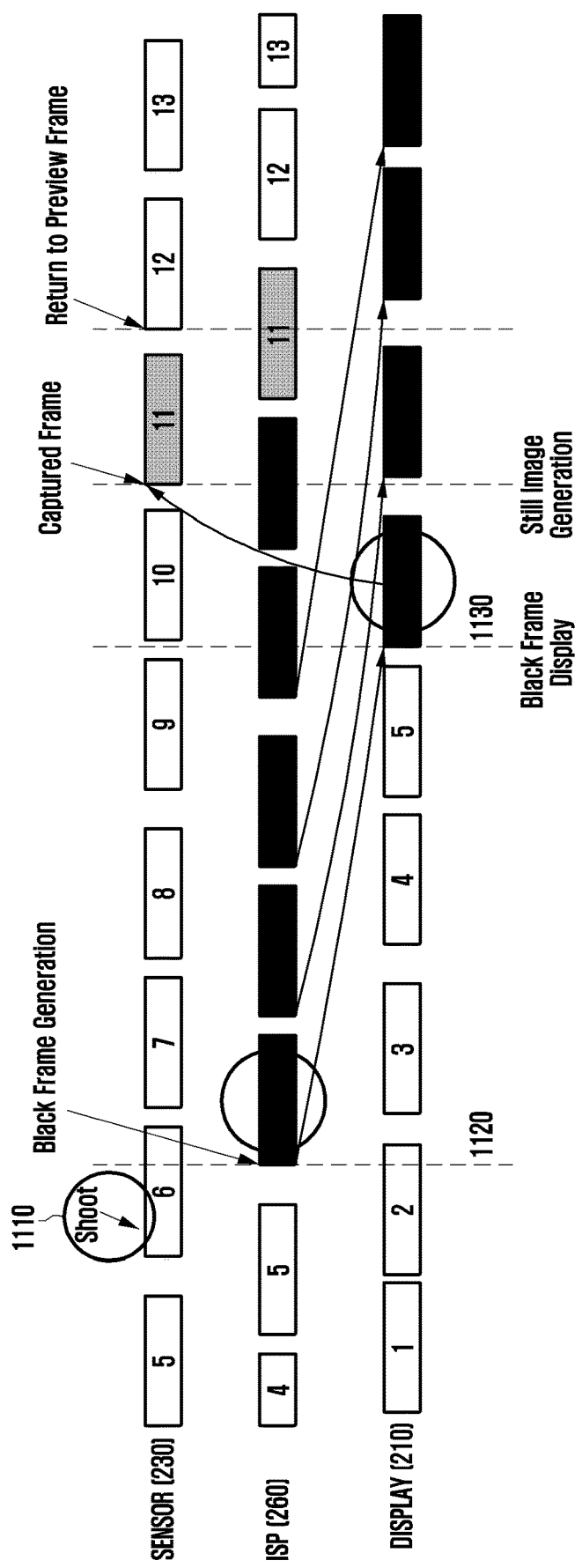
FIG. 11 illustrates, in units of frames, a process of capturing an image by an electronic device according to various embodiments.

FIG. 11 illustrates, in units of frames, a process of capturing an image by an electronic device according to various embodiments.

According to an embodiment, an outcome of image capturing by the image sensor 230 may be transferred to the image signal processor 260, and frame latency may occur in this process. That is, outputting of the image sensor 230 and processing of the image signal processor 260 may be sequentially performed, and thus may have a predetermined latency interval. In FIG. 4A, a description has been made of a process in which the image signal processor 260 receives a shoot command from a user to generate a first frame, and transfers the first frame to the display 210 so that the first frame is displayed in a subsequent frame. Unlike FIG. 5A, FIG. 11 may include a process in which there is latency of at least two frames until the image signal processor 260 receives a shoot command from a user in operation 1110, generates a first frame in operation 1120, and then displays the first frame on the display 210 in operation 1130. An image-capturing process thereafter may be similar to the process described above with reference to FIG. 4A.

Figure 12:
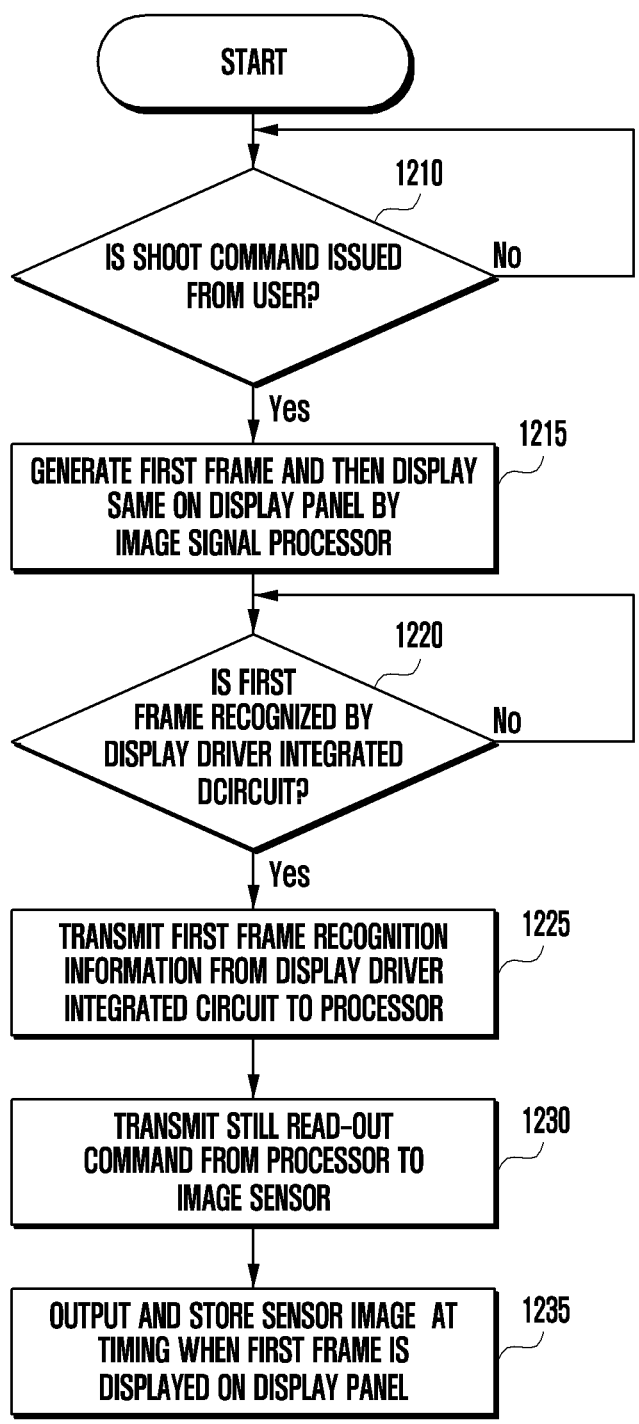
FIG. 12 illustrates a flowchart of a method for capturing an image by an electronic device according to various embodiments.

FIG. 12 illustrates a flowchart of a method for capturing an image by an electronic device according to various embodiments.

An illustrated method 1200 may be executed by an electronic device (e.g., the electronic device 200 in FIG. 2) described through FIGS. 1 to 11, and the redundant technical features may be omitted hereinafter.

According to various embodiments, the method for capturing an image by the electronic device 200 may include an operation of performing control to generate a first frame having a designated pixel value in response to a shoot command input from a user, an operation of performing control to output the first frame through a display panel (e.g., the display panel 212 in FIG. 2), an operation of capturing an image by the image sensor 230 when it is sensed that the first frame is output on the display panel 212, and an operation of performing control to store the captured image in a memory (e.g., the memory 250 in FIG. 2) in response to a storage command, for example a still capture command, for an image output from the image sensor 230.

According to various embodiments, the operation of performing control to output the first frame through the display panel 212 may include an operation of sensing that the first frame is being displayed on the display panel 212 and an operation of transmitting, to a processor (e.g., the processor 220 in FIG. 2), information indicating that the first frame is being displayed on the display panel 212.

According to an embodiment, the first frame may include a pixel group corresponding to a predetermined first region, and the first region may correspond to at least one of a partial region or the entire region of the display panel 212, which corresponds to the position of a camera.

In operation 1210, the processor 220 may sense a shoot command issued from a user. When the shoot command issued from a user is sensed, the processor 220 may perform, in operation 1215, control to generate a first frame (e.g., a black frame) through an image signal processor (e.g., the image signal processor 260 in FIG. 2). Subsequently, the processor 220 may perform control to display the generated first frame on the display panel 212.

In operation 1220, the display driver integrated circuit 214 may recognize the first frame being displayed on the display panel 212. When the first frame is recognized, the display driver integrated circuit 214 may transmit pertinent information to the processor 220 in operation 1225. The processor 220 may receive the pertinent information, and may transmit a capture command, for example a still readout command, a still capture command, or a sensor readout command, to the image sensor 230 in operation 1230. The image sensor 230, which has received the capture command, may output an image at the time when the first frame is displayed on the display panel 212. Furthermore, the image sensor 230 may store the image in the memory 250.

According to an embodiment, the processor 220 may control the image sensor 230 to output a preview image having a resolution lower than a predetermined level, and may control the image sensor 230 to output a capture image having a resolution higher than the predetermined level when it is sensed that the first frame is output on the display panel 212.

According to an embodiment, the electronic device 200 may further include an image signal processor (e.g., the image signal processor 260 in FIG. 2) operatively connected to the image sensor 230 and configured to process the image output from the image sensor 230. The processor 220 may control the image signal processor 260 to generate the first frame in response to the shoot command input from the user, and may transmit, to the display driver integrated circuit 214, the capture image converted into a low resolution by the image signal processor 260.

According to an embodiment, the operation of sensing that the first frame is being displayed on the display panel 212 may include an operation of acquiring statistical information including at least one of average or variance of pixels in units of predetermined region of interest (ROI), an operation of determining whether a frame displayed on the display panel 212 corresponds to the first frame, and an operation of transmitting, when the frame displayed on the display panel 212 corresponds to the first frame, information about whether the frame corresponds to the first frame to the processor 220.

According to an embodiment, the operation of sensing that the first frame is being displayed on the display panel 212 may include an operation of generating the first frame such that a predetermined first pattern is displayed, and, when a frame displayed on the display panel 212 includes a first pattern, determining that the frame displayed on the display panel 212 is the first frame.

According to an embodiment, the method for capturing an image by the electronic device 200 may further include an operation of analyzing a signal entering the image sensor 230 to generate statistical information including at least one among auto exposure (AE), auto focus (AF), or auto white balance (AWB).

According to an embodiment, the processor 220 may use, to generate the statistical information, a parameter related to auto exposure (AE), auto focus (AF), or auto white balance (AWB) immediately after the image signal processor 260 generates the first frame, or may use, to generate the statistical information, a parameter related to auto exposure (AE), auto focus (AF), or auto white balance (AWB) immediately before the image signal processor 260 generates the first frame. The processor 220 may analyze, when the first frame is displayed on the display panel 212, the signal entering the image sensor 230 to generate statistical information including at least one among auto exposure (AE), auto focus (AF), or auto white balance (AWB).

According to an embodiment, the processor 220 may perform image quality-related restoration processing with respect to a preview image output by the image sensor 230 and control the display panel 212 to display the preview image, and may control the display panel 212 to display the first frame instead of the preview image in response to the shoot command input from the user.

According to an embodiment, a method for capturing an image by the electronic device 200 may include an operation of adjusting the brightness of the display panel 212 in units of time in response to a shoot command input from a user, to configure a first interval during which the brightness of a frame displayed on the display panel 212 for a predetermined time is lower than a predetermined level, an operation of capturing an image through the image sensor 230 during the first interval, and an operation of storing the captured image in the memory 250.

Embodiments disclosed in the specification and the drawings merely provide specific examples for describing the technical matters according to the embodiments herein and helping to understand the technical matters, and do not limit the scope of the embodiments herein. Therefore, it should be construed that all modifications or modified forms capable of being derived from the technical idea of the present disclosure in addition to the embodiments disclosed herein are included in the scope of various embodiments herein.

What is claimed is:

1. An electronic device comprising:
a display panel;
an image sensor disposed at a lower end of the display panel;
at least one processor;
a display driver integrated circuit operatively connected to the display panel and the at least one processor, and configured to sense that a first frame is output on the display panel and transmit a first signal to the at least one processor based on the first frame being output on the display panel, and
a memory storing instructions which, when executed by the at least one processor, cause the electronic device to:
control to generate the first frame having a designated pixel value based on a shoot command being received from a user,
control the display panel to output the first frame, and
control the image sensor to capture an image based on the first signal being received from the display driver integrated circuit, and
store the captured image in the memory.

2. The electronic device of claim 1, wherein the first frame comprises a pixel group corresponding to a predetermined first region, and
wherein the predetermined first region corresponds to at least one of a partial region or an entire region of the display panel, which corresponds to a position of a camera.

3. The electronic device of claim 1, wherein the instructions, when executed by the at least one processor, cause the electronic device to:
control the image sensor to output a preview image having a resolution lower than a predetermined resolution, and
control the image sensor to output, based on the first signal, the captured image having a resolution higher than the predetermined resolution.

4. The electronic device of claim 3, further comprising an image signal processor operatively connected to the image sensor and configured to process the image output from the image sensor,
wherein the instructions, when executed by the at least one one processor, cause the electronic device to:
determine whether an output image that is output by the image sensor is the preview image or is the captured image,
perform image quality-related restoration processing on the preview image, and
convert the captured image to a low resolution captured image.

5. The electronic device of claim 4, wherein the instructions, when executed by the at least one processor, cause the electronic device to control the image signal processor to generate the first frame based on the shoot command being received from the user, and to transmit the low resolution captured image to the display driver integrated circuit.

6. The electronic device of claim 4, wherein the instructions, when executed by the at least one processor, cause the electronic device to generate the first frame such that a predetermined first pattern is displayed, and
wherein the display driver integrated circuit is further configured to determine that a frame displayed on the display panel is the first frame based on the frame including the predetermined first pattern.

7. The electronic device of claim 4, wherein the instructions, when executed by the at least one processor, cause the electronic device to:
adjust a brightness of the display panel in units of time to configure a first interval during which a brightness of a frame displayed on the display panel for a predetermined time is lower than a predetermined brightness, and
control the image sensor to output the captured image during the first interval, and
wherein the display driver integrated circuit is further configured to sense whether the first interval is entered, and to transmit the first signal to the at least one processor based on the first interval being entered.

8. The electronic device of claim 4, wherein the instructions, when executed by the at least one processor, cause the electronic device to:
analyze a signal entering the image sensor to generate statistical information comprising at least one from among auto exposure (AE) information, auto focus (AF) information, or auto white balance (AWB) information, and
wherein the statistical information is generated based on a parameter obtained immediately after the image signal processor generates the first frame, or based on a parameter obtained immediately before the image signal processor generates the first frame.

9. The electronic device of claim 4, wherein the instructions, when executed by the at least one processor, cause the electronic device to analyze, based on the first frame being displayed on the display panel, a signal entering the image sensor to generate statistical information comprising at least one from among auto exposure (AE) information, auto focus (AF) information, or auto white balance (AWB) information.

10. The electronic device of claim 1, wherein the instructions, when executed by the at least one processor, cause the electronic device to:
acquire statistical information comprising at least one of an average of pixels in a predetermined region of interest (ROI), or a variance of the pixels in the predetermined ROI,
analyze the statistical information to determine whether a frame displayed on the display panel corresponds to the first frame, and based on the frame corresponding to the first frame, transmit, to the at least one processor, information about whether the frame corresponds to the first frame.

11. A method for capturing an image by an electronic device, the method comprising:
   generating a first frame having a designated pixel value based on a shoot command being received from a user;
   outputting the first frame through a display panel, wherein the outputting comprises sensing that the first frame is displayed on the display panel
   capturing an image by an image sensor based on the sensing that the first frame is displayed on the display panel; and
   storing the captured image in a memory based on a still capture command instructing storage of the image.

12. The method of claim 11, wherein the first frame comprises a pixel group corresponding to a predetermined first region, and
   wherein the predetermined first region corresponds to at least one of a partial region or an entire region of the display panel, which corresponds to a position of a camera.

13. The method of claim 12, further comprising:
   outputting, by the image sensor, a preview image having a resolution lower than a predetermined resolution, and
   outputting, by the image sensor, the captured image having a resolution higher than the predetermined resolution based on the sensing that the first frame is displayed on the display panel.

14. The method of claim 13, wherein the electronic device comprises an image signal processor operatively connected to the image sensor and configured to process the image output from the image sensor,
   wherein the first frame is generated by the image signal processor based on the shoot command being received from the user, and
   wherein the method further comprises:
   converting the captured image into a low resolution captured image by the image signal processor, and
   transmitting, by the image signal processor, the low resolution captured image to a display driver integrated circuit.

15. The method of claim 14, further comprising analyzing a signal entering the image sensor to generate statistical information comprising at least one from among auto exposure (AE) information, auto focus (AF) information, or auto white balance (AWB) information.

16. The method of claim 15, further comprising:
   based on the first frame being displayed on the display panel, analyzing the signal entering the image sensor to generate the statistical information based on a parameter obtained immediately after the image signal processor generates the first frame, or based on a parameter obtained immediately before the image signal processor generates the first frame.

17. The method of claim 11, wherein the sensing that the first frame is displayed on the display panel comprises:
   acquiring statistical information comprising at least one of an average of pixels in a predetermined region of interest (ROI), or a variance of the pixels in the predetermined ROI;
   determining whether a frame displayed on the display panel corresponds to the first frame; and
   based on the frame corresponding to the first frame, transmitting, to at least one processor included in the electronic device, information about whether the frame corresponds to the first frame.

18. The method of claim 11, wherein the sensing that the first frame is displayed on the display panel comprises:
   generating the first frame such that a predetermined first pattern is displayed; and
   based on a frame displayed on the display panel including the predetermined first pattern, determining that the frame is the first frame.

19. The method of claim 11, further comprising:
   performing image quality-related restoration processing with respect to a preview image output by the image sensor and control the display panel to display the preview image, and
   controlling the display panel to display the first frame instead of the preview image based on the shoot command being received from the user.

* * * * *